(12) United States Patent
Puri et al.

(10) Patent No.: US 10,958,937 B2
(45) Date of Patent: Mar. 23, 2021

(54) ENCODING AND DECODING METHOD AND CORRESPONDING DEVICES

(71) Applicant: InterDigital VC Holdings, Inc., Wilmington, DE (US)

(72) Inventors: Saurabh Puri, Rennes (FR); Sebastien Lasserre, Thorigné Fouillard (FR); Patrick Le Callet, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 15/774,992

(22) PCT Filed: Nov. 2, 2016

(86) PCT No.: PCT/EP2016/076438
§ 371 (c)(1),
(2) Date: May 9, 2018

(87) PCT Pub. No.: WO2017/080887
PCT Pub. Date: May 18, 2017

(65) Prior Publication Data
US 2018/0324462 A1    Nov. 8, 2018

(30) Foreign Application Priority Data
Nov. 9, 2015 (EP) ..................... 15306779

(51) Int. Cl.
*H04N 19/60* (2014.01)
*H04N 19/176* (2014.01)
(Continued)

(52) U.S. Cl.
CPC ............. *H04N 19/60* (2014.11); *H04N 19/12* (2014.11); *H04N 19/124* (2014.11);
(Continued)

(58) Field of Classification Search
CPC .... H04N 19/60; H04N 19/184; H04N 19/124; H04N 19/176; H04N 19/94;
(Continued)

(56) References Cited

U.S. PATENT DOCUMENTS 5,767,986 A * 6/1998 Kondo ................... H04N 19/98
358/426.14
6,161,043 A * 12/2000 McClure .............. A61B 5/0006
607/27
(Continued)

FOREIGN PATENT DOCUMENTS

EP         1014727        6/2000
JP      2001309380 A    11/2001
(Continued)

OTHER PUBLICATIONS

Andrews et al., "Singular Value Decomposition (SVD) Image Coding", IEEE Transactions on Communications, Apr. 1976, pp. 425-432.
(Continued)

*Primary Examiner* — Joseph Suh
(74) *Attorney, Agent, or Firm* — Invention Mine LLC

(57) ABSTRACT

A method for decoding a bitstream representative of a picture is disclosed. Information representative of at least one encoding precision is first determined. A transform is then decoded responsive to the determined information. Finally, the picture is decoded using the decoded transform. A method for encoding a bitstream representative of a picture, as well as encoding devices and decoding devices are also disclosed.

28 Claims, 6 Drawing Sheets

(51) Int. Cl.

| | |
|---|---|
| *H04N 19/12* | (2014.01) |
| *H04N 19/136* | (2014.01) |
| *H04N 19/94* | (2014.01) |
| *H04N 19/463* | (2014.01) |
| *H04N 19/126* | (2014.01) |
| *H04N 19/124* | (2014.01) |
| *H04N 19/184* | (2014.01) |

(52) U.S. Cl.
CPC ......... *H04N 19/126* (2014.11); *H04N 19/136* (2014.11); *H04N 19/176* (2014.11); *H04N 19/184* (2014.11); *H04N 19/463* (2014.11); *H04N 19/94* (2014.11)

(58) Field of Classification Search
CPC .. H04N 19/136; H04N 19/126; H04N 19/463; H04N 19/12
See application file for complete search history.

(56) References Cited

U.S. PATENT DOCUMENTS

| | | | |
|---|---|---|---|
| 6,831,947 B2 | 12/2004 | Ribas | |
| 2005/0030205 A1* | 2/2005 | Konoshima | H04N 19/70 341/50 |
| 2005/0053242 A1* | 3/2005 | Henn | G10L 19/008 381/22 |
| 2007/0070454 A1* | 3/2007 | Ernst | H04N 1/46 358/504 |
| 2009/0046569 A1* | 2/2009 | Chen | H04L 1/0029 370/203 |

FOREIGN PATENT DOCUMENTS

| | | |
|---|---|---|
| JP | 2009005041 A | 1/2009 |
| RU | 2408076 | 12/2010 |
| WO | 2010087808 A1 | 8/2010 |
| WO | WO2014103294 | 7/2014 |
| WO | WO2014120367 | 8/2014 |
| WO | WO2015128222 | 9/2015 |

OTHER PUBLICATIONS

Goldrick et al., "Image Coding Using the Singular Value Decomposition and Vector Quantization", 5th IEEE International Conference on Image Processing and its Applications, Edinburgh, United Kingdom, Jul. 4, 1995, pp. 296-300.

Yang et al., "Combined Techniques of Singular Value Decomposition and Vector Quantization for Image Coding", IEEE Transactions on Image Processing, vol. 4, No. 8, Aug. 1995, pp. 1141-1146.

Marpe et al., "Context-Based Adaptive Binary Arithmetic Coding in the H.264/AVC Video Compression Standard", IEEE Transactions on Circuits and Systems for Video Technology, vol. 13, No. 7, Jul. 2003, pp. 620-636.

Selesnick et al., "A Diagonally-Oriented DCT-Like 2D Block Transform", SPIE Proceedings, vol. 8136, Wavelets and Sparsity XIV, Sep. 27, 2011, pp. 1-14.

Garguir, N., "Comparative Performance of SVD and Adaptative Cosine Transform in Coding Images", IEEE Transactions on Communications, vol. COM-27, No. 8, Aug. 1979, pp. 1230-1234.

JP2009005041 A, Translated "Encoding Device and Method, Decoding Device and Method, Program, Recording Medium, and Data Structure" Jan. 8, 2009.

JP2001309380 A, Translated "Device and Method for Encoding/Decoding Picture Signal, and Picture Signal Encoding/Decoding Program Recording Medium" Nov. 2, 2011.

\* cited by examiner

ENCODING AND DECODING METHOD AND CORRESPONDING DEVICES

This application claims the benefit, under 35 U.S.C. § 365 of International Application PCT/EP2016/076438, filed Nov. 2, 2016, which was published in accordance with PCT Article 21(2) on May 18, 2017, in English, and which claims the benefit of European Patent Application No. 15306779.8, filed Nov. 9, 2015.

1. TECHNICAL FIELD

In the following, a method and a device for encoding a picture are disclosed. Corresponding decoding method and decoding device are further disclosed.

2. BACKGROUND ART

Conventionally, in many video and picture codec's developed in the last decades (MPEG2, h264/AVC, HEVC, VP8, VP9, etc.), fixed transforms (DCT, DST, etc.) are applied to the pixels of each block (more precisely to their residual) to obtain transformed coefficient, more precisely frequency coefficients. These frequency coefficients are then quantized by a quantizer Q to obtain quantized coefficients which are encoded by an entropy coder (VLC, arithmetic coder, CABAC, etc.).

Alternatively to fixed transforms, content-adaptive transform may be used such as the ones disclosed in the PCT application PCT/EP15/053298 published on Sep. 3, 2015. Using such a content-adaptive transform leads to a better compaction of the energy, thus reducing the bitrate. However, the adaptive transforms must be sent to the decoder, increasing the bitrate in return. If one does not take care on the way of sending the transforms, the global bitrate rate may increase.

For example, a non-separable transform of 64×64 size learned on residual blocks of size 8×8 requires 64×64×10=40 Kbits when encoded at a precision of 10 bits. Therefore, the coding cost of four such transforms would require approximately 160 Kbits. More generally, a transform to be applied on a block of pixels of size N×N is composed of $N^2$ vectors of size $N^2$ (i.e. having $N^2$ components). Thus, the size of the transform increases rapidly with N, namely as $N^4$. This is a significant amount of information to encode compared to the bit-rate of the sequence itself, especially at low bit rate.

There is thus a need of a method for encoding such content-adaptive transforms with a small bitrate overhead.

3. BRIEF SUMMARY

A method for decoding a bitstream representative of a picture is disclosed that comprises:
 determining information representative of at least one encoding precision;
 decoding a transform responsive to said determined information;
 decoding said picture using the decoded transform.

In a first embodiment, determining an information representative of an encoding precision comprises decoding said encoding precision from the bitstream.

According to a specific characteristic, said information representative of an encoding precision is a number of bits.

In a variant, said information representative of an encoding precision is a bit decrement.

In another embodiment, the method further comprises decoding information representative of a number of transform vectors, determining information representative of at least one encoding precision comprises decoding information representative of an encoding precision for each transform vector and decoding said transform responsive to said determined information comprises decoding components of each transform vector responsive to the associated encoding precision.

A method for encoding a picture is also disclosed that comprises:
 determining information representative of at least one encoding precision;
 encoding a transform responsive to said determined information; and
 encoding said picture using the encoded transform.

A decoding device is disclosed that comprises:
 means for determining information representative of at least one encoding precision;
 means for decoding a transform responsive to said determined information; and
 means for decoding said picture using the decoded transform.

An encoding device is disclosed that comprises:
 means for determining information representative of at least one encoding precision;
 means for encoding a transform responsive to said determined information; and
 means for encoding said picture using the encoded transform.

A bitstream is disclosed that comprises information representative of at least one encoding precision, information representative of a transform encoded responsive to said encoded precision and information representative of a picture encoded using the encoded transform.

A non-transitory storage medium is disclosed that comprises a bitstream comprising: information representative of at least one encoding precision, information representative of a transform encoded responsive to said encoded precision and information representative of a picture encoded using the encoded transform.

4. BRIEF SUMMARY OF THE DRAWINGS

5. DETAILED DESCRIPTION

It will be understood that, although the terms first and second may be used herein to describe various color components, these color components should not be limited by these terms. These terms are only used to distinguish one color component from another. For example, a first color component could be termed "a component" or "a second color component", and, similarly, a second color component could be termed "another component" or "a first color component" without departing from the teachings of the disclosure.

The encoding/decoding method according to the present principles make it possible to reduce the overhead cost when encoding transforms. These transforms may be obtained using a typical block based adaptive transform learning algorithm. A transform T is represented by a set of transform vectors. A content adaptive transform T determined on-the-fly is more efficient for compacting the energy of the transformed coefficients. More precisely, the energy in the transformed domain is higher in the first few coefficient positions compared to the last coefficient positions. A quantization parameter (QP) defines the quality level/bit-rate of a codec where, the higher value of QP means low bit-rate and vice-versa. The encoding method according to a particular embodiment takes into account the sum of energies/amplitudes of quantized coefficients at each coefficient position for determining a number of transform vectors to encode.

A scalar quantization of the transform T generates a transform G of less precision. In contrast to the prior art, a suitable precision value in terms of bits is determined for each transform vector at the encoder side and encoded in the bit-stream along with the quantized transform vectors. At the decoder side, first the precision value for each transform vector is decoded. For a precision value greater than zero, the corresponding transform vector is decoded from the bit-stream and reconstructed by scaling each value of the transform vector by the precision value. For a precision value of zero, the corresponding transform vector is constructed as zero vector.

The encoding method comprises encoding, for a transform to be applied on pixels for obtaining coefficients, a number of transform vectors and a precision, e.g. a number of bits used to encode each component of a transform vector. Encoding a number of transform vectors and the precision makes it possible reduce the overhead due to encoding transforms without affecting the overall performance of the codec A transform T is represented by n transform vectors denoted v. Each transform vector v comprises components.

Figure 1A:
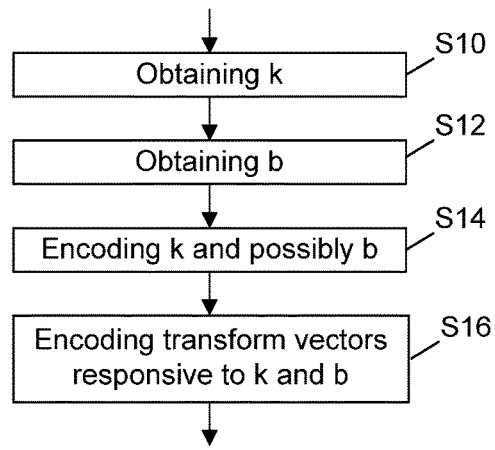
FIGS. 1A and 1B represent a flowcharts of a method for encoding a transform in a bitstream according to specific and non-limiting embodiments.

FIG. 1A represents a flowchart of a method for encoding a transform in a bitstream according to a specific and non-limiting embodiment.

In a step S10, a number k of transform vectors with k≤n is obtained, k being an integer (section 5.2).

In a step S12, an encoding precision b is obtained that is to be used to encode the k first transform vectors of the transform T. More precisely, a precision is determined for each transform vector of the transform T. The precision b may be determined based data driven statistical model (section 5.3).

In a step S14, information representative of k and possibly information representative b are encoded. In a variant, only an information representative of k is encoded. In the latter case, the encoding precision b is going to be deduced from a syntax element (e.g. QP) on the decoder side. The encoding precision b may be encoded directly as a number of bits. In a variant, the precision b is encoded as a number m of bits only for the first transform vector and as a decrement for the other transform vectors. In a variant, m being known by both the encoder and decoder, a bit decrement is encoded for all transform vectors. In this case encoding k may be avoided because the number k maybe determined when the encoding bit precision b equals 0.

The information representative of precision b may be:
 a. An integer that indicates directly the number of bits used to encode each component of the transform vector,
 b. Information that indicate the evolution of the number of bits, i.e. bit decrement. As an example, this information is a flag that signals a decrement of the precision by one bit. When the flag equals 0 then the precision is not changed and when the flag equals 1 then the precision is decremented by 1.

Optionally, the number N of transforms may also be coded in the bitstream. In a step S16, the transform T (more precisely its transform vectors v) is encoded in a bitstream responsive to the value of k and the value of the precision b. Encoding the transform T may comprise quantizing the transform vector components and coding the quantized components of a transform vector using a lossless entropy coder. In a variant, the transform vector components are encoded using an entropy coder in order to minimize the bit-rate associated to their coding.

The encoded transform are advantageously used to encode pictures. In the encoding process they replace the fixed transforms (DCT, DST, Hadamard, etc) that are used in classical encoders (e.g. H.264/AVC, H.265/HEVC, etc).

Figure 1B:
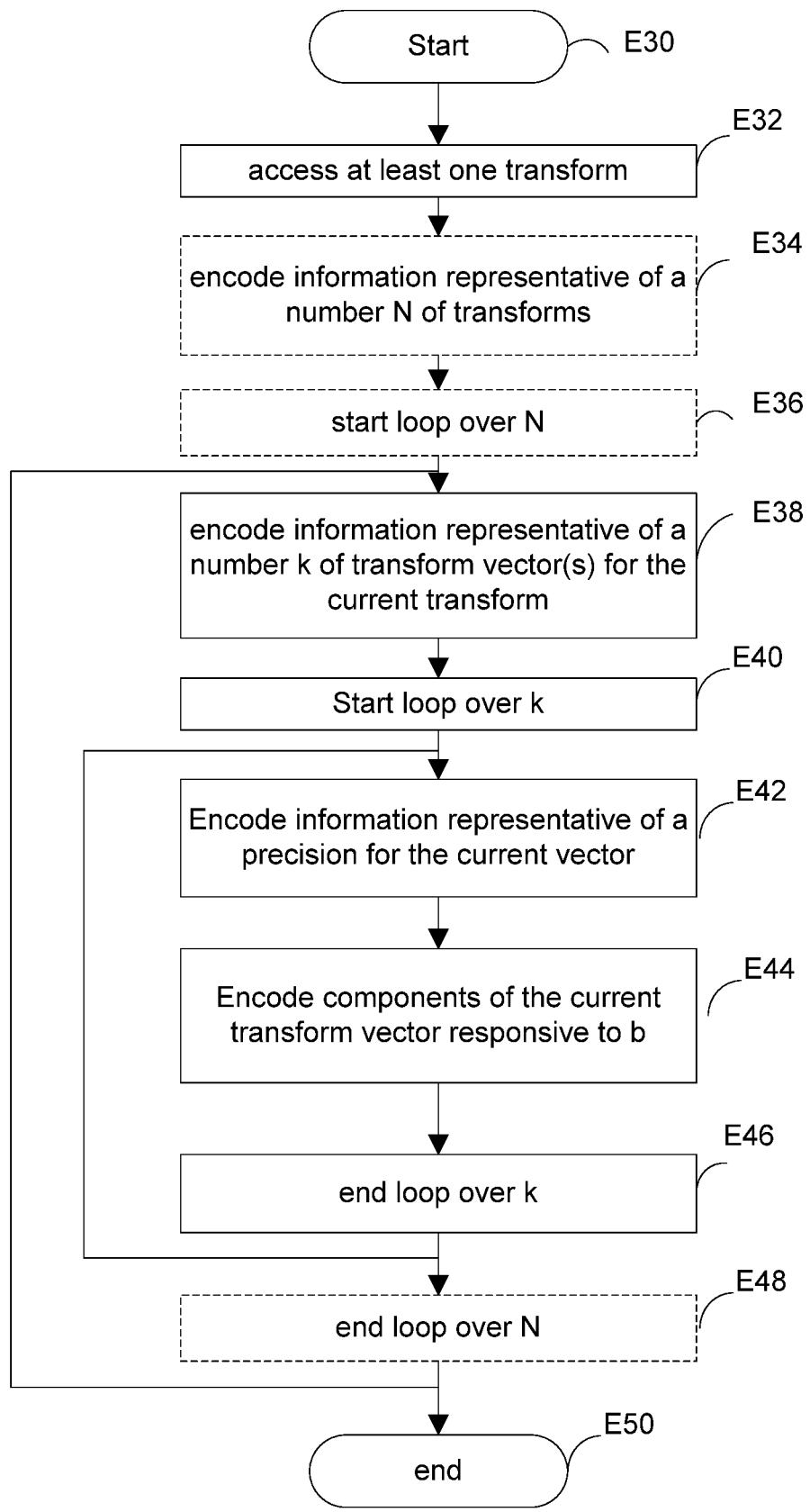

An exemplary embodiment is disclosed on FIG. 1B. The method begins at step E30. At step E32, an encoder accesses at least one current transform. At an optional step E34, an information representative of a number N of transforms is encoded in a bitstream. The encoder optionally starts a loop over N at step E36. At step E38, an information representative of a number k of transform vectors is encoded for the current transform. At step E40, the encoder begins a loop over k. At step E42, The encoder encodes an information representative of an encoding precision b for a current transform vector. At step E44, the encoder encodes the components of the current transform vector responsive to the precision b. In step E46, ends the loop over k and in step E48 the loop over N. The method ends at step E50.

5.1 Determination of Adaptive Transforms to be Encoded (for Illustrative Purpose)

Determination of adaptive transforms is not part of the encoding method according to the present principles. Indeed, the transforms to be encoded may also be determined off-line and stored on a storage medium.

Figure 2:
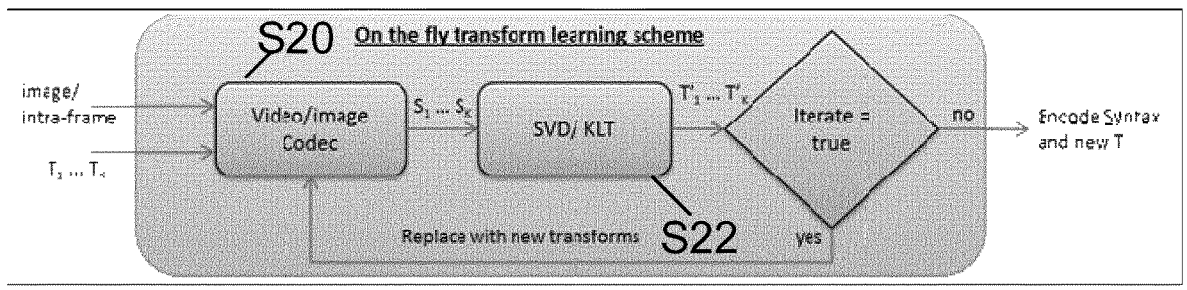
FIG. 2 represents a flowchart of an on-the-fly block based transform learning scheme for illustrative purpose only.

An adaptive set of orthogonal transforms may be used in place of the systematic fixed transforms (DCT, DST, etc.) or in place of transforms that are learned offline on a large training set using different classification and transform optimization schemes. This set of adaptive transforms is fed to a codec and the best transform out of a set is chosen in Rate Distortion Optimization (RDO) loop. A more adaptive approach is to learn a set of orthogonal transforms for a particular intra picture of a sequence. This is referred as on-the-fly block based transform learning scheme in the rest of the document. This scheme is described in FIG. 2.

This block diagram shows a typical on-the-fly scheme in which the algorithm is split into two parts, i.e. classification of the residual blocks inside the video/picture codec and generation of the new set of transforms. In a step S20, the residual blocks are classified into K different classes ($S_1 \ldots S_K$). In a step S22, a new transform is obtained for each class using minimization of the reconstruction error for that particular class. Typically, Singular Value Decomposition (SVD) and KLT may be used to generate an orthogonal set of transforms. These two steps are iterated until convergence of the solution or until a stop criteria (e.g. a number of iterations) is reached. As seen in the block diagram, the input to the system is an intra picture or an picture along with some initial set of non-separable orthogonal transforms ($T_1 \ldots T_K$). The system outputs a set of learned transforms ($T'_1 \ldots T'_K$) along with the syntax information that need to be encoded into the bit-stream which is sent to a decoder. Each transform $T'_1$ is represented by a set of transform vectors. In general, the overhead bits required to encode these transform vectors is significantly large compared to the bits required to encode the picture.

5.2 Transform Vector Coding Using Incomplete Representation

According to a non-limiting embodiment, obtaining the number k of transform vectors at step S10 comprises determining the number k from the content and from QP. Due to the energy compaction property of SVD, it is observed that the overhead cost can be considerably reduced by deducing an incomplete representation of the learned transforms where, only first 'k' transform vectors are transmitted to the decoder and the remaining (n–k) transform vectors are either generated using a completion algorithm similar to Gram-Schmidt method or forced to zero. The completion method may be performed both at the encoder and decoder. An example of such a completion method is disclosed in *A diagonally oriented dct-like 2d block transform*, Selesnick I. W.; Guleryuz, O. G., in SPIE optical engineering and applications, 2011.

In order to illustrate the effect of dropping the last few transform vectors of a transform, four non-separable optimized transforms of size 64×64 are learned on the 4K sequences 'PeopleOnStreet' and 'Traffic'. Encoding tests are performed on these sequences. The first 'k' transform vectors are retained and the rest of the transform vectors are completed using a completion algorithm.

Figure 3:
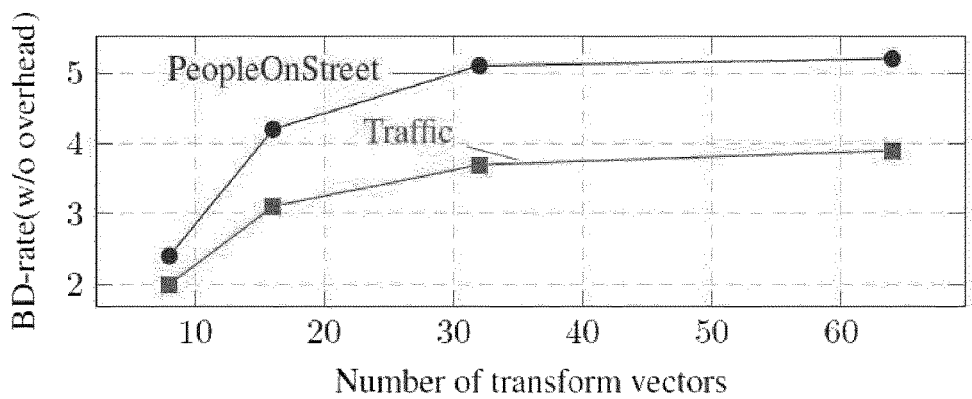
FIG. 3 shows the variation of the performance gain with respect to the number of coded transform vectors.

FIG. 3 shows the variation of the performance gain with respect to the number of coded transform vectors. The vertical axis is the percentage gain relative to an anchor (HEVC test software HM15.0) and without taking into account the transform cost. FIG. 3 shows that when retaining just the first half of the transform vectors, i.e. k=32, there is negligible performance drop in terms of rate-distortion performance (or BD rate), here expressed as a percentage increase compared to the anchor. For the case of k=16, i.e. when only first 16 transform vectors are coded, the performance drops by 1% compared to the overall bit-rate obtained by coding all 'n' basis transform vectors, but the overhead cost of transform vectors reduces to one fourth of the total overhead. When k=8, there is considerable loss of performance (in terms of BD-rate). Nevertheless, in the latter case the overhead is further reduced. In general, this shows that there exists a trade-off between the performance loss and the overhead cost.

Since, the performance drop in terms of BD-rate when encoding only first 'k' transform may be used to estimate an optimal value of 'k'. Intuitively, at low bit-rates, most of the coefficients are quantized to zero and at high bit rate, the coefficients energy is significant even at high frequencies. Therefore, the value of 'k' may depend on the content as well as on the quantization parameter QP.

The residual signal energy is mostly concentrated into the first few coefficients. The energy decreases as we go towards the higher frequency coefficients. Therefore, most of the high frequency coefficients are quantized to zero. A thresholding may be applied in order to compute the value of 'k' which is then coded along with the picture. An example of such a thresholding is disclosed below. Let E be the sum of energy/amplitude of the transformed coefficients obtained from the transformation of blocks. A threshold t is defined by multiplying E with a parameter p:

$$t = p \cdot E$$

As an example, $p=10^{-2}$, $5*10^{-3}$ or $10^{-3}$. The value of 'p' is found experimentally. The value of 'k' is computed from the number of transform vectors for which the associated energy/amplitude of the transformed coefficients is statistically greater than this threshold; the statistic being found from a large number of blocks to be transformed by the transform.

Table 1 shows the variation of the ratio of the number 'k' of vectors above this threshold divided by the total number n ($=N^2$) of vectors, for a chosen value of 'p'. It is observed from Table 1 that the number of transform vectors to be encoded is smaller at high QP than at low QP. Moreover, the number of transform vectors 'k' also varies depending on the content.

| | | Ratio $k/N^2$ of the vectors to encode | | | |
|---|---|---|---|---|---|
| QP | 'p' | PeopleOnStreet | Traffic | Nebuta | SteamLocomotive |
| 22 | 0.01 | 0.23 | 0.24 | 0.30 | 0.32 |
| | 0.005 | 0.27 | 0.29 | 0.32 | 0.35 |
| | 0.001 | 0.45 | 0.48 | 0.46 | 0.46 |
| 27 | 0.01 | 0.20 | 0.22 | 0.28 | 0.31 |
| | 0.005 | 0.25 | 0.27 | 0.31 | 0.34 |
| | 0.001 | 0.38 | 0.39 | 0.38 | 0.43 |
| 32 | 0.01 | 0.18 | 0.19 | 0.26 | 0.28 |
| | 0.005 | 0.21 | 0.22 | 0.29 | 0.30 |
| | 0.001 | 0.29 | 0.30 | 0.39 | 0.36 |
| 37 | 0.01 | 0.14 | 0.15 | 0.23 | 0.23 |
| | 0.005 | 0.18 | 0.18 | 0.26 | 0.25 |
| | 0.001 | 0.23 | 0.23 | 0.30 | 0.30 |

5.3 Determining the Precision of Transform Vectors

According to a non-limiting embodiment, obtaining the precision b at step 20 comprises determining b from precision decrease found by a statistical model as described below. An additional bit-rate saving may be obtained by decreasing the precision of coding of the transform T.

Let v(i) be a component of a transform vector v of size n. The initial precision is defined as a fixed number of bits 'm', required to represent the first vector. A vector v(i) will be coded with a decrement d of precision such that its precision is b=m−d bits, i.e.

$$0 \leq v(i) < 2^{m-d}$$

Figure 4:
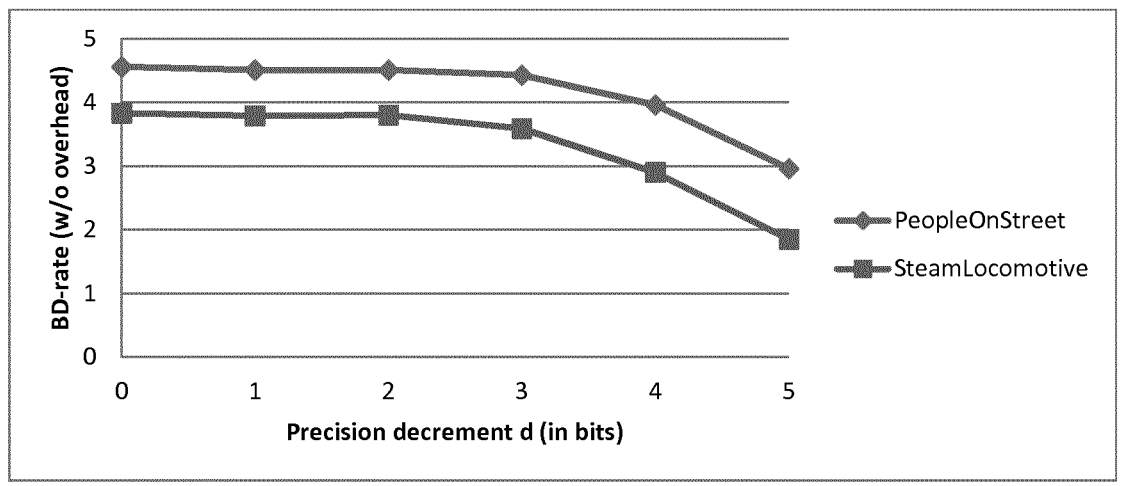
FIG. 4 shows the effect of using adaptive transforms with reduced precision.

FIG. 4 shows the effect of using the adaptive transforms with reduced precision on the overall percentage of gain on two video sequences. Again, the vertical axis is the percentage of performance gain compared to anchor (HEVC test software HM15.0) and without taking the transform cost into account.

Figure 5:
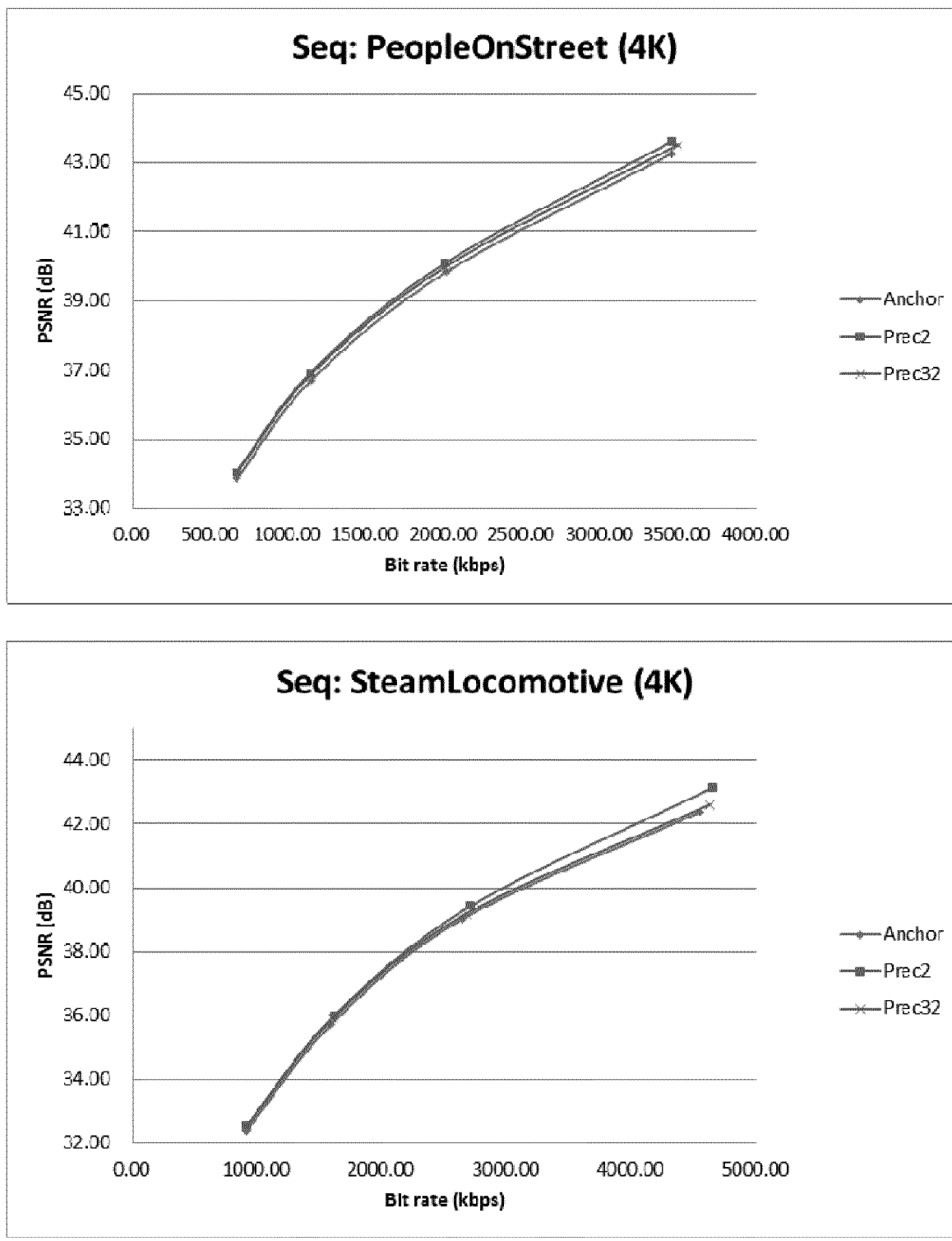
FIG. 5 shows the effect of precision decrement on the performance at various bit-rates.

FIG. 4 shows that decreasing the precision by d=1 and d=2 has a negligible impact on the BD-rate performance. There is a slight loss in the case where the precision is further decreased (d=3 and d=4). Therefore, decreasing the precision is beneficial since it reduces the overhead bit-rate needed for storing and transmitting the transform vectors. Additionally, it is observed that the effect on the overall BD-rate is content dependent. FIG. 5 shows the effect of precision decrement (d=1 for 'Prec2', d=5 for 'Prec32') on the performance at various bit-rates. It is observed that the precision decrement has little effect at low bit-rate. Therefore, the precision decrement d depends on the video content and the QP parameter, namely.

$$d = f(\mu, QP)$$

where $\mu$ is a factor dependent on the content. A model is described below for determining an optimal value of the precision decrement d for each transform vector that minimizes the loss in performance due to the decrement in precision. The basic idea behind this model is to find a bound on error induced by quantization of transform vector such that the variance of the error induced due to the transform quantization is less than the variance of the error induced due to the scalar quantizer present in a video/picture codec. Let the variance of error due to quantization of coefficients in a codec is denoted by $D(\Delta_q)$ and the variance of error due to the quantization of transform T is denoted by $D(\Delta_g)$.

Quantization of a Transform

The decrement of precision can be seen as quantization of the transform where the step size of the quantizer $\Delta_g$ is shown as $$\Delta_g = 2^d$$

Let T a non-separable integer transform, obtained for instance by the learning algorithm as described above. Let G=g(T) be the transform obtained after the quantization of T, where g(•) is defined as a quantization function which depends on the step $\Delta_g$ as follows $$G = \text{sgn}(T) \cdot \left\lfloor \frac{T}{\Delta_g} + 0.5 \right\rfloor \cdot \Delta_g$$

Let r be a residual block (straightforwardly put under a vector form to get obvious matrix notation) to be transformed and quantized in order to be compressed by the video codec. The associated transformed coefficient blocks c and c' after transformation by T and G respectively are $$T \cdot r = c$$

$$G \cdot r = c'$$

The average variance of the error in the transformed domain is defined by $$\sigma_g^2 = \frac{1}{N} E[(c' - c)^2] = \frac{1}{N} E[(c' - c)^T (c' - c)]$$

$$\sigma_g^2 = \frac{1}{N} E[(G \cdot r - T \cdot r)^T (G \cdot r - T \cdot r)]$$

A quantization error matrix $\Lambda$ is defined as $$\Lambda = G - T$$

Therefore, the error variance equation can be written as $$\sigma_g^2 = \frac{1}{N^2} E[(\Lambda \cdot r)^T (\Lambda \cdot r)] = \frac{1}{N^2} E[r^T \cdot \Lambda^T \cdot \Lambda \cdot r] = \frac{1}{N^2} E[r^T \cdot M \cdot r]$$

where $M = \Lambda^T \Lambda$. An upper bound for the above equation is easily found to get $$\sigma_g^2 \leq \frac{1}{N^2} \cdot \sigma_r^2 \cdot \sum_i \sum_j |M(i,j)|$$

As each value in the matrix $\Lambda$ is proportional to the step size $\Delta_g$ and lies between $(-\Delta_g/2, +\Delta_g/2)$, the sum of absolute values in M is proportional to the step size such that $$\Sigma_i \Sigma_j |M(i,j)| = \gamma \cdot \Delta_g = \gamma \cdot 2^d$$

where $\gamma$ is a parameter computed experimentally for each transform. Therefore, an upper bound of the variance due to the quantization of the transforms is given as $$D(\Delta_g) = \frac{1}{N^2} \cdot \sigma_r^2 \cdot \gamma \cdot 2^d$$

Quantization of Transformed Coefficients

The coefficients obtained after transformation of the residual block are quantized using a uniform scalar quantizer $Q(\cdot)$, with a dead-zone, whose step size $\Delta_q$ depends on the quantization parameter (QP) which may be chosen at the picture level or at the block level using so-called adaptive QP.

The mean-squared error (MSE) due to the quantization of a coefficient is $$D(\Delta_q) = \int_{-(\Delta_q - o\Delta_q)}^{(\Delta_q - o\Delta_q)} x^2 p(x) dx + 2 \Sigma_{i=1}^{\infty} \int_{i\Delta_q - o\Delta_q}^{(i+1)\Delta_q - o\Delta_q} (x - i \cdot \Delta_q)^2 p(x) dx$$

where x denotes the coefficient values, o is the rounding offset, and p(x) denotes the probability distribution of the coefficient. It is known from the literature that the coefficients obtained from DCT-like integer transforms follow more or less a zero-mean Laplace distribution defined by $$p(x) = \frac{\lambda}{2} e^{-\lambda |x|}$$

where $\lambda$ is the Laplacian distribution parameter related to the standard deviation $\sigma$ of the coefficients by $\lambda = \sqrt{2}/\sigma$. Substituting the above formulation of p(x) in the MSE equation provides an expression in terms of $\lambda$ and $\Delta_q$. This suggests that the variance of quantization error depends on these two parameters and, therefore, the expression can be simply expressed as $$D(\Delta_q) \approx \alpha (\Delta_q)^\beta$$

where the two parameter $\alpha$, $\beta > 0$ depend on $\lambda$ which in turn depends on the content. The expression shows that there is an exponential relationship between the quantization error variance and the quantization step-size.

In order to minimize the effect of the change in transformed coefficient values due to the quantization of the transform, the variance $D(\Delta_g)$ should be kept strictly less than the variance of the error induced due to the scalar quantizer present in a video/picture codec. Therefore, the relation between the two variances $D(\Delta_g)$ and $D(\Delta_q)$ as obtained above is shown as $$D(\Delta_g) \leq D(\Delta_q)$$

Substituting the expressions from above, the relation can be shown as:

$$d \leq \log_2 \left( \frac{N \cdot \alpha}{\sigma_r^2 \cdot \gamma} (\Delta_q)^\beta \right)$$

A relationship between the precision decrement d and the quantization step size $\Delta_q$, which is related to QP, is thus obtained. The parameters α, β and $\sigma_r^2$ are content dependent and the parameters γ and N are related to the transform itself. Therefore, these parameters can be derived separately for each content in order to determine the accurate value of the precision drop d and then the precision b=m−d. Advantageously, $$d = \log_2\left(\frac{N \cdot \alpha}{\sigma_r^2 \cdot \gamma}(\Delta_q)^\beta\right)$$

d may be the closest integer smaller than $\log_2$ $$\left(\frac{N \cdot \alpha}{\sigma_r^2 \cdot \gamma}(\Delta_q)^\beta\right).$$

5.4 Syntax and Decoding Process

Figure 6:
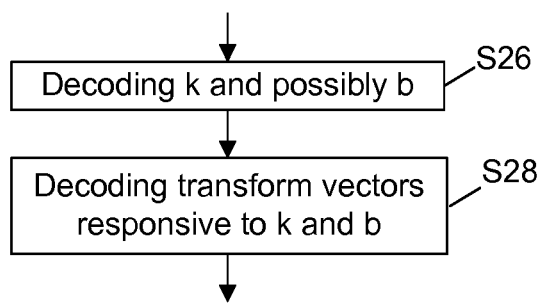
FIGS. 6 and 7 represent flowcharts of a method for decoding a transform from a bitstream according to a specific and non-limiting embodiment.

FIG. 6 represents a flowchart of a method for decoding a transform T from a bitstream according to a specific and non-limiting embodiment.

In a step S26, an information representative of a number of transform vectors 'k' is decoded. Possibly an information representative of a precision b is further decoded for each transform vector. The information may be a number of bits used to encode each component of the transform vector. In a variant, a precision decrement is decoded. In the latter case, a number of bits m may be decoded at least for the first transform vector. In a variant m is known by the decoder and a precision decrement d is decoded for each transform vector.

The information representative of the precision b may be:
a. an integer that signals directly the number of bits used to encode each component of the transform vector,
b. information that indicates the evolution of the number of bits, i.e. bit decrement. As an example, this information is a flag that signals a decrement of the precision by one bit. When the flag equals 0 then the precision is not changed and when the flag equals 1 then the precision is decremented by 1. In this case encoding k may be avoided because the number k maybe determined when the encoding bit precision b equals 0.

Optionally, an information representative of a number of adaptive transforms 'N' encoded into the bit-stream. In the case where several transforms are encoded, then the information (for k and b) are encoded for each transform.

In a step S28, the transform vectors of the transform T are decoded responsive to k and b. More precisely, each component of the transform vectors is decoded from the bitstream and dequantized to obtain the transform T. The non-decoded transform vectors (i.e. the (n−k) transform vectors may either be set to 0 or may be determined using a completion method.

The decoded transforms may then be used to decode pictures. In the decoding process the decoded transforms replace the fixed DCT/Hadamard transforms that are used in classical decoders (H.264/AVC, H.265/HEVC, etc).

Figure 7:
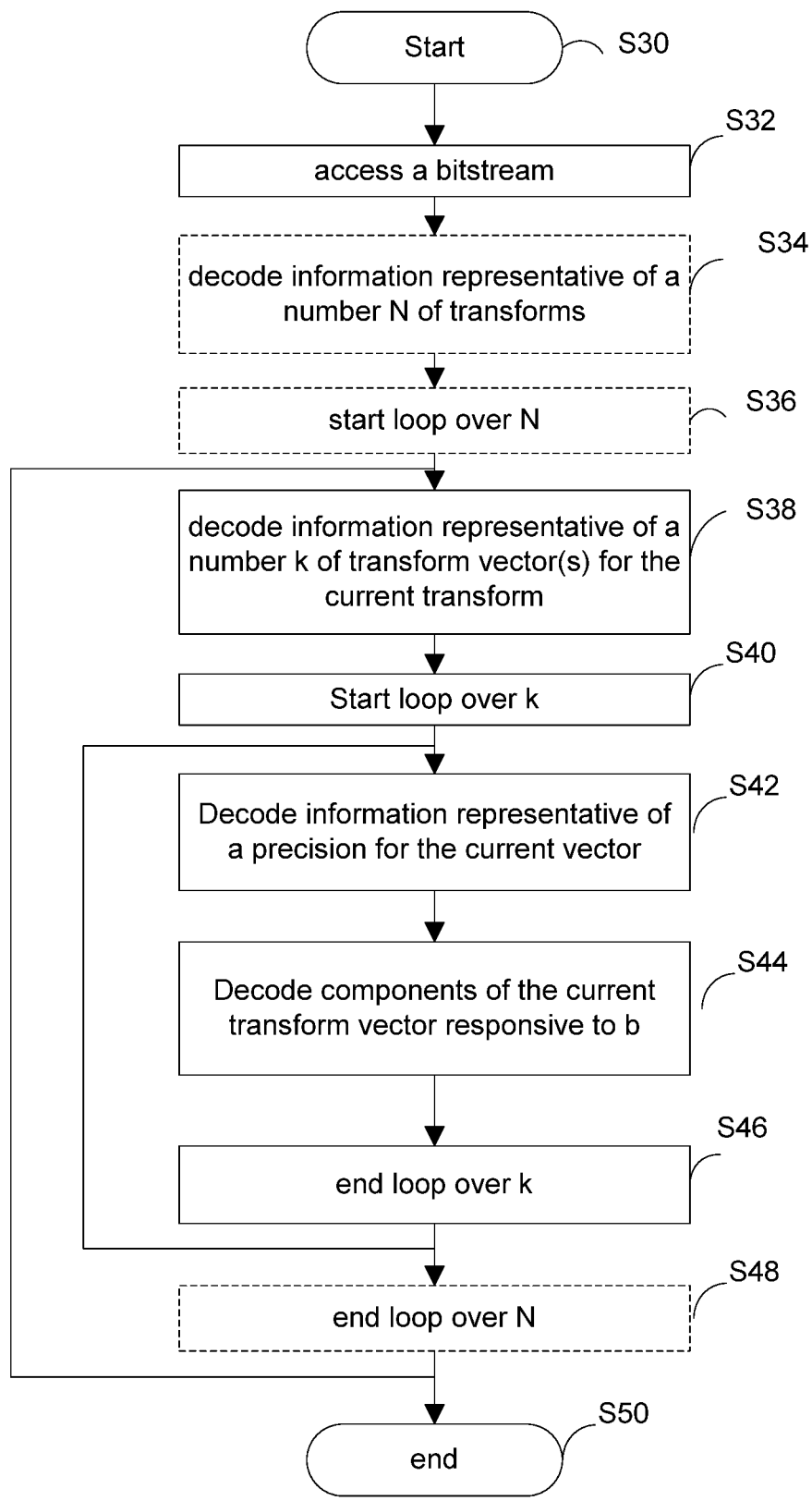

An exemplary embodiment is disclosed on FIG. 7. The method begins at step S30. At step S32, a decoder accesses a bitstream. At an optional step S34, an information representative of a number N of transforms is decoded from the accessed bitstream. The decoder optionally starts a loop over N at step S36. At step S38, an information representative of a number k of transform vectors is decoded for a current transform. At step S40, the decoder begins a loop over k. At step S42, The decoder decodes an information representative of an encoding precision b for a current transform vector. At step S44, the decoder decodes the components of the current transform vector responsive to the precision b. In step S46, ends the loop over k and in step S48 the loop over N. The method ends at step S50.

Figure 8:
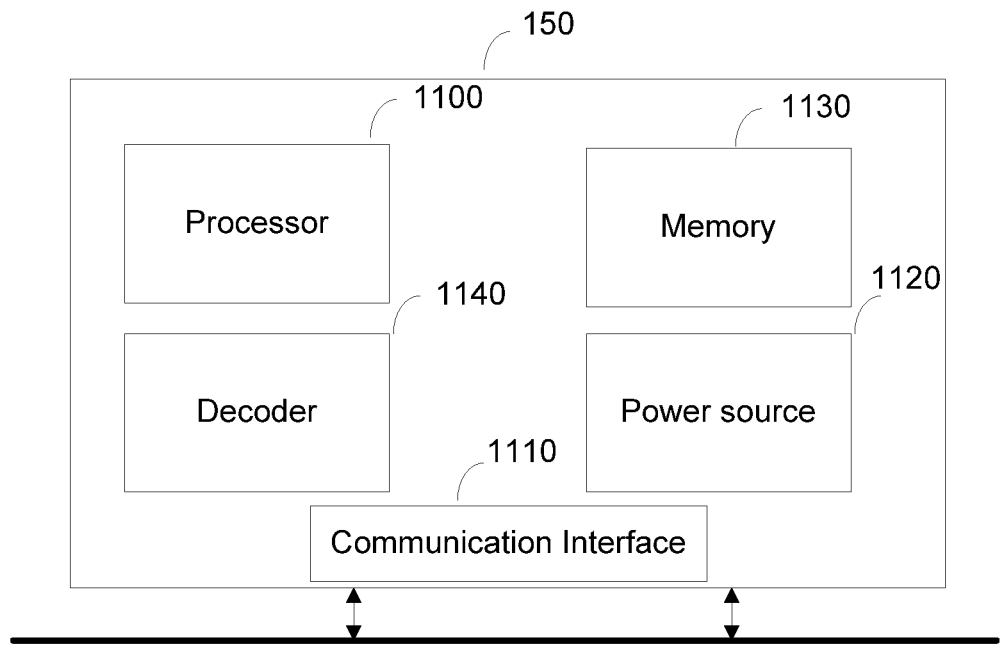
FIG. 8 represents an exemplary architecture of the receiver configured to decode a picture from a bitstream according to a non-limiting embodiment.

FIG. 8 represents an exemplary architecture of a receiver 110 configured to decode a picture from a bitstream according to a non-limiting embodiment.

The receiver 110 comprises one or more processor(s) 1100, which could comprise, for example, a CPU, a GPU and/or a DSP (English acronym of Digital Signal Processor), along with internal memory 1510 (e.g. RAM, ROM and/or EPROM). The receiver 110 comprises one or more communication interface(s) 1110, each adapted to display output information and/or allow a user to enter commands and/or access data (e.g. a keyboard, a mouse, a touchpad, a webcam, etc); and a power source 1120 which may be external to the receiver 110. The receiver 110 may also comprise one or more network interface(s) (not shown). Decoder module 1140 represents the module that may be included in a device to perform the decoding functions. Additionally, decoder module 1140 may be implemented as a separate element of the receiver 110 or may be incorporated within processor(s) 1100 as a combination of hardware and software as known to those skilled in the art.

The bitstream may be obtained from a source. According to different embodiments, the source can be, but not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an picture capturing circuit (e.g. a sensor such as, for example, a CCD (or Charge-Coupled Device) or CMOS (or Complementary Metal-Oxide-Semiconductor)).

According to different embodiments, the decoded picture may be sent to a destination, e.g. a display device. As an example, the decoded picture is stored in a remote or in a local memory, e.g. a video memory or a RAM, a hard disk. In a variant, the decoded picture is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limiting embodiment, the receiver 110 further comprises a computer program stored in the memory 1130. The computer program comprises instructions which, when executed by the receiver 110, in particular by the processor 1100, enable the receiver to execute the method described with reference to FIGS. 6 and/or 7. According to a variant, the computer program is stored externally to the receiver 110 on a non-transitory digital data support, e.g. on an external storage medium such as a HDD, CD-ROM, DVD, a read-only and/or DVD drive and/or a DVD Read/Write drive, all known in the art. The receiver 110 thus comprises a mechanism to read the computer program. Further, the receiver 110 could access one or more Universal Serial Bus (USB)-type storage devices (e.g., "memory sticks.") through corresponding USB ports (not shown).

According to exemplary and non-limiting embodiments, the receiver 110 can be, but not limited to:
- a mobile device;
- a communication device;
- a game device;
- a set top box;
- a player, e.g. a Blu-Ray player;
- a TV set;
- a tablet (or tablet computer);
- a laptop;
- a display and
- a decoding chip.

Figure 9:
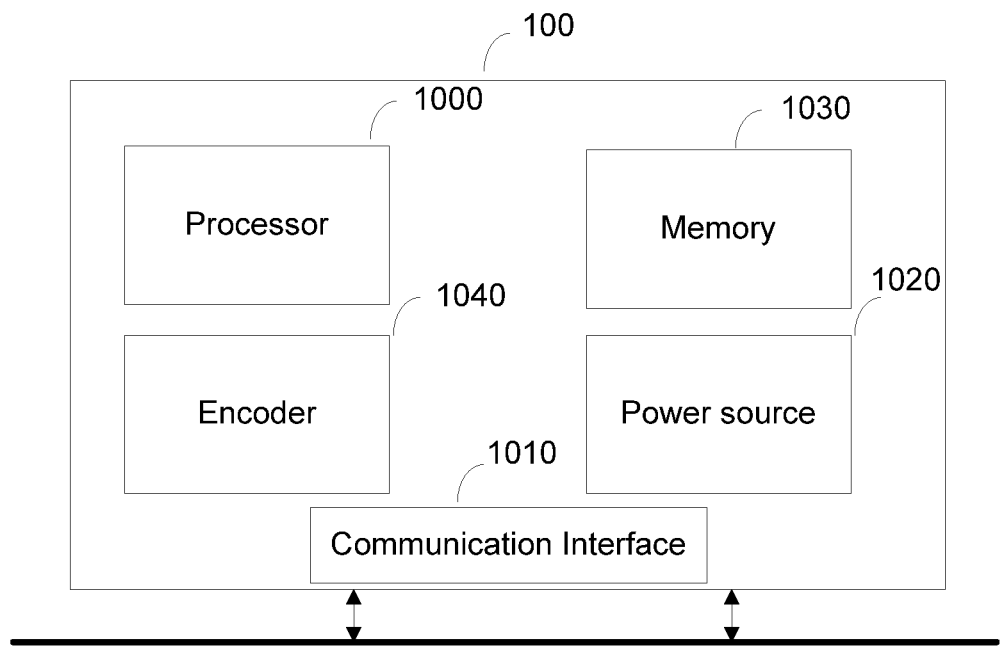
FIG. 9 represents an exemplary architecture of a transmitter configured to encode a picture in a bitstream according to a non-limiting embodiment.

FIG. 9 represents an exemplary architecture of a transmitter 100 configured to encode a picture in a bitstream according to a non-limiting embodiment.

The transmitter 100 comprises one or more processor(s) 1000, which could comprise, for example, a CPU, a GPU and/or a DSP (English acronym of Digital Signal Processor), along with internal memory 1030 (e.g. RAM, ROM, and/or EPROM). The transmitter 100 comprises one or more communication interface(s) 1010, each adapted to display output information and/or allow a user to enter commands and/or access data (e.g. a keyboard, a mouse, a touchpad, a webcam); and a power source 1020 which may be external to the transmitter 100. The transmitter 100 may also comprise one or more network interface(s) (not shown). Encoder module 1040 represents the module that may be included in a device to perform the coding functions. Additionally, encoder module 1140 may be implemented as a separate element of the transmitter 100 or may be incorporated within processor(s) 1000 as a combination of hardware and software as known to those skilled in the art.

The picture may be obtained from a source. According to different embodiments, the source can be, but is not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an picture capturing circuit (e.g. a sensor such as, for example, a CCD (or Charge-Coupled Device) or CMOS (or Complementary Metal-Oxide-Semiconductor)).

According to different embodiments, the bitstream may be sent to a destination. As an example, the bitstream is stored in a remote or in a local memory, e.g. a video memory or a RAM, a hard disk. In a variant, the bitstream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limiting embodiment, the transmitter 100 further comprises a computer program stored in the memory 1030. The computer program comprises instructions which, when executed by the transmitter 100, in particular by the processor 1000, enable the transmitter 100 to execute the method described with reference to FIGS. 1A and/or 1B. According to a variant, the computer program is stored externally to the transmitter 100 on a non-transitory digital data support, e.g. on an external storage medium such as a HDD, CD-ROM, DVD, a read-only and/or DVD drive and/or a DVD Read/Write drive, all known in the art. The transmitter 100 thus comprises a mechanism to read the computer program. Further, the transmitter 100 could access one or more Universal Serial Bus (USB)-type storage devices (e.g., "memory sticks.") through corresponding USB ports (not shown).

According to exemplary and non-limiting embodiments, the transmitter 100 can be, but is not limited to:
- a mobile device;
- a communication device;
- a game device;
- a tablet (or tablet computer);
- a laptop;
- a still picture camera;
- a video camera;
- an encoding chip;
- a still picture server; and
- a video server (e.g. a broadcast server, a video-on-demand server or a web server).

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method, comprising:
   decoding, from a bitstream, a transform represented by one or more transform vectors;
   decoding, from said bitstream, a picture using the decoded transform wherein decoding said transform comprises decoding an information representative of a total count of the number of transform vectors and further comprises for at least one transform vector:
   decoding an information representative of a precision for said transform vector, said precision being the number of bits of quantized components of said transform vector;
   decoding said quantized components of said transform vector responsive to said precision; and
   dequantizing decoded quantized components of said transform vector.

2. The method of claim 1, wherein said information representative of said precision is a number of bits.

3. The method of claim 1, wherein said information representative of said precision is a bit decrement.

4. The method of claim 1, wherein said information representative of said precision is a number of bits for the first transform vector of said transform and a bit decrement for the remaining transform vectors of said transform.

5. A method, comprising:
   accessing a transform represented by one or more transform vectors;
   encoding said transform in a bitstream;
   encoding a picture in the bitstream using the encoded transform wherein encoding said transform in the bitstream comprises encoding (E38) an information representative of a total count of the number of transform vectors and further comprises for at least one transform vector:
   encoding an information representative of a precision for said transform vector, said precision being the number of bits of quantized components of said transform vector;
   quantizing said components of said transform vector; and
   encoding said quantized components of said transform vector responsive to said precision.

6. The method of claim 5, wherein said information representative of said precision is a number of bits.

7. The method of claim 5, wherein said information representative of said precision is a bit decrement.

8. The method of claim 5, wherein said information representative of said precision is a number of bits for the first transform vector of said accessed transform and a bit decrement for the remaining transform vectors of said accessed transform.

9. A decoding device comprising a communication interface configured to access at least a bitstream and at least one processor configured to:
   decode, from said accessed bitstream, a transform represented by one or more transform vectors;
   decode, from said bitstream, said picture using the decoded transform wherein to decode said transform comprises to decode an information representative of a total count of the number of transform vectors and wherein said at least one processor is further, for at least one transform vector, configured to:
   to decode an information representative of a precision for said transform vector, said encoding precision being the number of bits of quantized components of said transform vector;
   to decode said quantized components of said transform vector responsive to said precision; and
   to dequantize decoded quantized components of said transform vector.

10. The device of claim 9, wherein said information representative of said precision is a number of bits.

11. The device of claim 9, wherein said information representative of said precision is a bit decrement.

12. The device of claim 9, wherein said information representative of said precision is a number of bits for the first transform vector of said transform and a bit decrement for the remaining transform vectors of said transform.

13. An encoding device comprising a communication interface configured to access a picture and at least one processor configured to:
   access a transform represented by one or more transform vectors;
   encode said transform in a bitstream;
   encode said accessed picture in the bitstream using the encoded transform wherein to encode said transform in the bitstream comprises to encode an information representative of a total count of the number of transform vectors and wherein said at least one processor is further, for at least one transform vector, configured to:
   to encode an information representative of a precision for said transform vector, said precision being the number of bits of quantized components of said transform vector;
   to quantize said components of said transform vector; and
   to encode said quantized components of said transform vector responsive to said precision.

14. The device of claim 13, wherein said information representative of said precision is a number of bits.

15. The device of claim 13, wherein said information representative of said precision is a bit decrement.

16. The device of claim 13, wherein said information representative of said precision is a number of bits for the first transform vector of said accessed transform and a bit decrement for the remaining transform vectors of said accessed transform.

17. A non-transitory computer readable medium storing a bitstream, said bitstream comprising information representative of a transform represented by one or more transform vectors and information representative of a picture encoded using the encoded transform wherein said information representative of a transform comprises information representative of a total count of the number of transform vectors and further comprises for at least one transform vector:
   information representative of a precision for said transform vector, said precision being the number of bits of quantized components of said transform vector; and
   information representative of said quantized components of said transform vector obtained responsive to said precision.

18. The non-transitory computer-readable medium of claim 17, wherein said information representative of said precision is a number of bits.

19. The non-transitory computer-readable medium of claim 17, wherein said information representative of said precision is a bit decrement.

20. The non-transitory computer-readable medium of claim 17, wherein said information representative of said precision is a number of bits for the first transform vector of said accessed transform and a bit decrement for the remaining transform vectors of said accessed transform.

21. A non-transitory machine readable medium having stored thereon machine executable instructions that, when executed, implement a method comprising:
   decoding, from a bitstream, a transform represented by one or more transform vectors;
   decoding, from said bitstream, a picture using the decoded transform wherein decoding said transform comprises decoding an information representative of a total count of the number of transform vectors and further comprises for at least one transform vector:
      decoding an information representative of a precision for said transform vector, said precision being the number of bits of quantized components of said transform vector;
      decoding said quantized components of said transform vector responsive to said precision; and
      dequantizing decoded quantized components of said transform vector.

22. The non-transitory machine readable medium of claim 21, wherein said information representative of said precision is a number of bits.

23. The non-transitory machine readable medium of claim 21, wherein said information representative of said precision is a bit decrement.

24. The non-transitory machine readable medium of claim 21, wherein said information representative of said precision is a number of bits for the first transform vector of said transform and a bit decrement for the remaining transform vectors of said transform.

25. A non-transitory machine readable medium having stored thereon machine executable instructions that, when executed, implement a method comprising:
   accessing a transform represented by one or more transform vectors;
   encoding said transform in a bitstream;
   encoding a picture in the bitstream using the encoded transform wherein encoding said transform in the bitstream comprises encoding an information representative of a total count of the number of transform vectors and further comprises for at least one transform vector:
      encoding an information representative of a precision for said transform vector, said precision being the number of bits of quantized components of said transform vector;
      quantizing said components of said transform vector; and
      encoding said quantized components of said transform vector responsive to said precision.

26. The non-transitory machine readable medium of claim 25, wherein said information representative of said precision is a number of bits.

27. The non-transitory machine readable medium of claim 25, wherein said information representative of said precision is a bit decrement.

28. The non-transitory machine readable medium of claim 25, wherein said information representative of said precision is a number of bits for the first transform vector of said accessed transform and a bit decrement for the remaining transform vectors of said accessed transform.

* * * * *

UNITED STATES PATENT AND TRADEMARK OFFICE
CERTIFICATE OF CORRECTION

PATENT NO. : 10,958,937 B2
APPLICATION NO. : 15/774992
DATED : March 23, 2021
INVENTOR(S) : Puri et al.

It is certified that error appears in the above-identified patent and that said Letters Patent is hereby corrected as shown below:

In the Claims

Claim 9, Column 14, Line 33, delete "encoding" before "precision"

Signed and Sealed this
Twenty-third Day of August, 2022

Katherine Kelly Vidal
*Director of the United States Patent and Trademark Office*